United States Patent [19]
Marcelius

[11] Patent Number: 5,020,947
[45] Date of Patent: Jun. 4, 1991

[54] AUTOMATIC LOCKING SYSTEM
[75] Inventor: Peter Marcelius, Loddekopinge, Sweden
[73] Assignee: Buffers AB, Täby, Sweden
[21] Appl. No.: 415,954
[22] Filed: Oct. 3, 1989
[51] Int. Cl.⁵ .................. B60P 01/64; A44B 17/00
[52] U.S. Cl. .................................. 410/70; 410/84; 410/91; 24/613
[58] Field of Search .................... 410/80–83, 410/90, 68–70, 84, 91; 24/287, 613; 248/503, 507

[56] References Cited
U.S. PATENT DOCUMENTS

| | | | |
|---|---|---|---|
| 3,924,544 | 12/1975 | Grau et al. | 410/83 X |
| 4,379,668 | 4/1983 | Pelletier | 410/69 X |
| 4,564,984 | 1/1986 | Takaguchi | 410/82 X |
| 4,776,736 | 10/1988 | Tatina | 410/83 |

Primary Examiner—Douglas C. Butler
Assistant Examiner—Alfred Muratori
Attorney, Agent, or Firm—Browdy and Neimark

[57] ABSTRACT

An automatic locking system for different sized containers on flat cars or trailers. The locks at the corner of the loading space are not retractable but have automatic locking mechanism that holds the container down. The locks in the center of the loading space are retractable and positioned to lock the adjacent ends of shorter containers and will be automatically retracted into the holder of the locks, when a longer container is lowered down over the locks. The retractable locks are retracted by the weight of the long container when the container presses on a release mechanism placed between the locks on top of the lock-holder. When the long container is unloaded, the retractable center locks automatically are released from the holder and will automatically become locked into a loading position.

9 Claims, 5 Drawing Sheets

RETRACTED

LOCKED

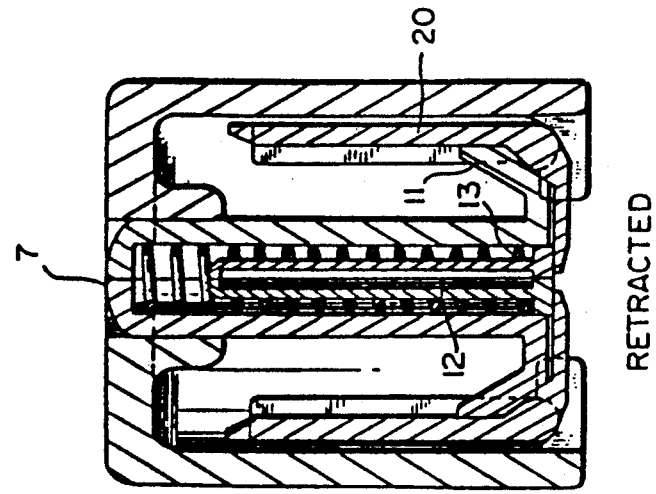
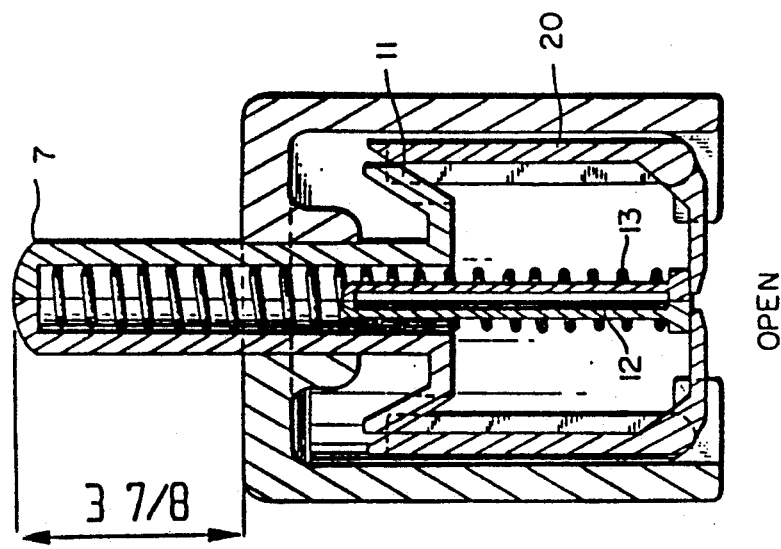
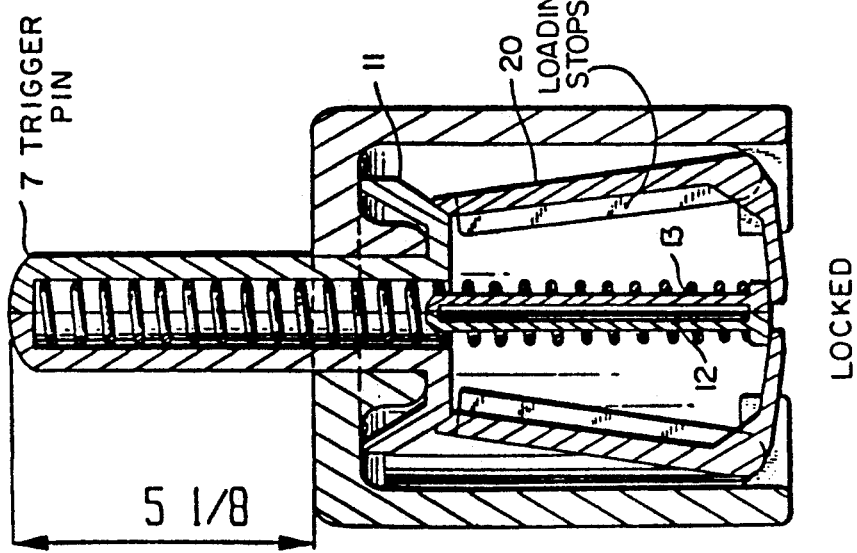

AUTOMATIC LOCKING SYSTEM

FIELD OF THE INVENTION

The present invention relates to hold down and locking devices for cargo containers and more particularly a fully automatic hold down device system capable of holding down either one or simultaneously several containers on load carriers, such as railway cars or road trailers. The container is automatically locked to the carrier just by lowering the container down over the locking housings. The system also adjusts itself automatically with respect to the number of locking housings required on a standard 40 foot point loading space. E.g. for two 20 foot containers 8 locks are required but for one container 40 foot or longer with 40 foot locking points, only the 4 outer end locks are required.

DESCRIPTION OF PRIOR ART

Hold down devices for securing containers to flat beds on both rail and road vehicles, are well known in the art. One example is the pedestal lock with an automatic latch as illustrated in U.S. Pat. Nos. 4,430,032 and 3,774,551. These can however only lock containers with one standard width.

A development of the pedestal lock came about when the need to lock containers with different outside widths became apparent. The width between the locking points on standard ISO type containers are kept constant even if the outside width is 8 foot or 8 foot 6 inches. This made it possible to move the latch from the pedestal to a locking spigot, that fitted into the bottom aperture of the corner casting of the container, making the latch lock to the inside of the corner casting, rather than outside it, see U.S. Pat. No. 4,092,040.

U.S. Pat. No. 4,776,736 shows a twin container hold down device that automatically retracts below deck level when the locks are not needed. The locks are manually operated for locking and unlocking.

SUMMARY OF THE INVENTION

The present invention provides a hold down and locking device system which can be used to hold down and lock either one long container or simultaneously several shorter containers.

The locking device system consists of four fixed non-retractable locking devices positioned one at each corner of the car at the outer standard locking points of the container, and at least two retractable locking devices with at least four locking housings positioned at the longside of the car between said outer locking points at the standard positions of the apertures which according to e.g. ISO standards must be available at the bottom of the container.

One main problem when loading and freighting containers with a length of 20 foot or less on the same car as containers more than 20 foot, has been that the locking devices for the 20 foot containers became an obstacle for the longer containers.

The handling of containers on both rail and road has been extensive and increased during the past 25 years. The importance of safe and quickly operated locking devices has therefore been well known for some time in the trade. The fact that the ISO standard type freight containers now are available in two outside widths, 8 foot and 8 foot 6 inch, has made the popular pedestal lock or pedestal side support, unpractical to use. The pedestal locks can be manually moved longitudinally on the flat, to fit the desired loading requirements, depending on the size of containers to be loaded, but it cannot be moved transversally. To overcome the lack of width adaptability, the pedestals were in some cases replaced by spigot container locks with a built in automatic locking device. None of these were retractable so for the four 20 foot points in the centre of the 40 foot loading space, something else must be fitted. One way of solving this was to fit the twin container hold down, but then the locking had to be manually operated. Another way was to just fit side supports, two each side of the loading space. The inner for 8 foot width and the outer for 8 foot 6 inch width. However, both inner and outer side support had to be manually operated. They also did not offer any locking of the containers.

The present invention provides a solution to all these problems without any need for manual operations from the ground as the weight of the lowering container is enough to maneuver all the functions. This saves both labor time and loading time and it also increases the safety since every container corner is locked down to the load carrier.

BRIEF DESCRIPTION OF THE DRAWINGS

FIG. 5 is a section view of the trigger device in locked, open and retracted position with the trigger pin (7) with the flange (11), the guiding pin (12) and the locking plates (20). Said locking plates (20) are of L-form type beneath the trigger pin part and extending below the guiding pin (12). The guiding pin (14) and the spring (13) keep the locking plates (20) in a locking position when the trigger pin is unloaded.

DESCRIPTION OF THE PREFERRED EMBODIMENTS

Figure 1:
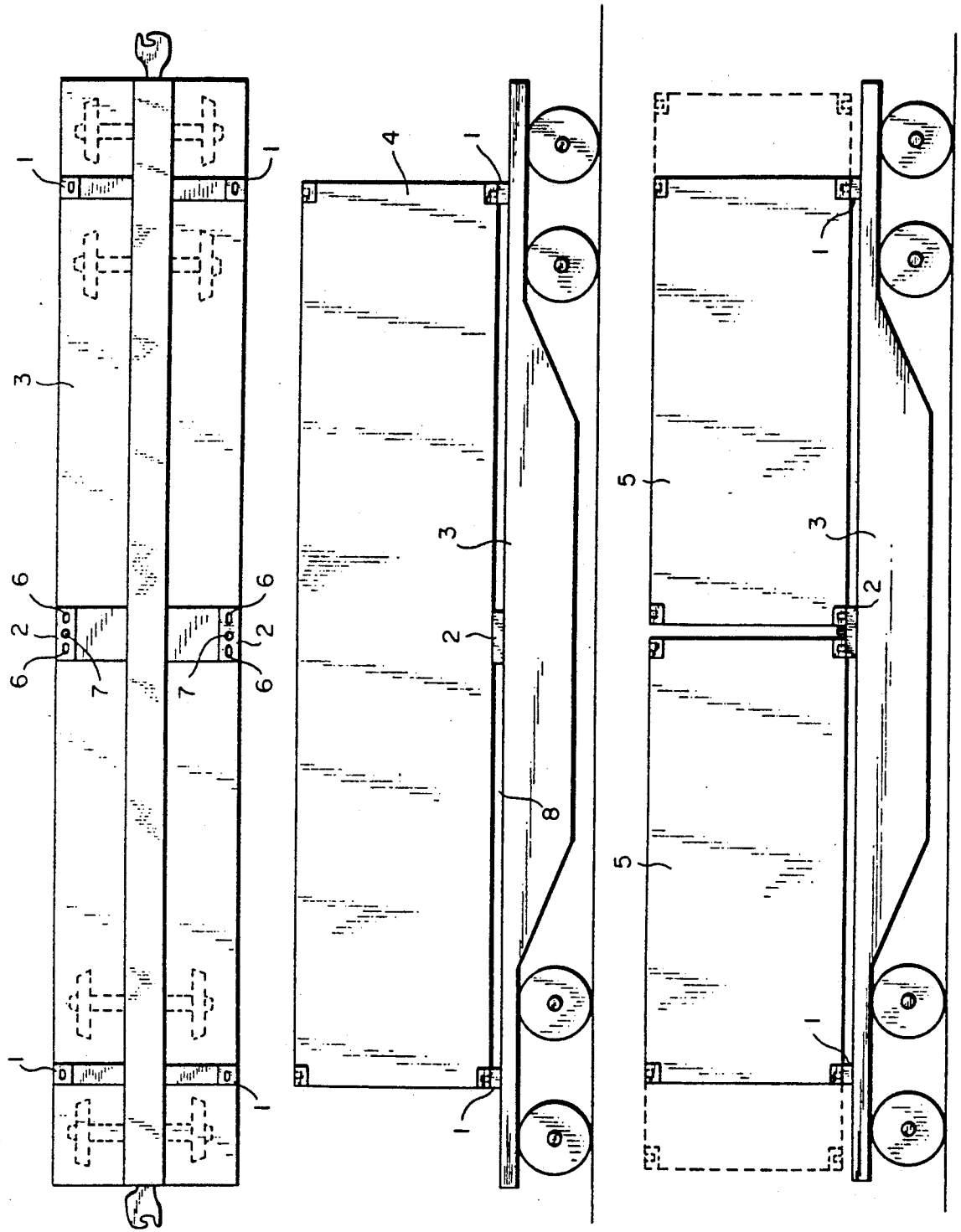
FIG. 1 is an over view and side views of the loading space on a freight carrier in the form of a railway flat car equipped with the fully automatic locking systems according to the present invention (1) is a non retractable locking device box
(2) is a retractable locking device box with 2 locking housings (6) and a trigger pin (7)
(3) is a railway flat car
(4) is a long container (40 foot)
(5) are two shorter containers (20 foot each)
(6) is a retractable locking housing
(7) is a trigger pin
(8) is the necessary gripper space between the container and the flat car.
Figure 2:
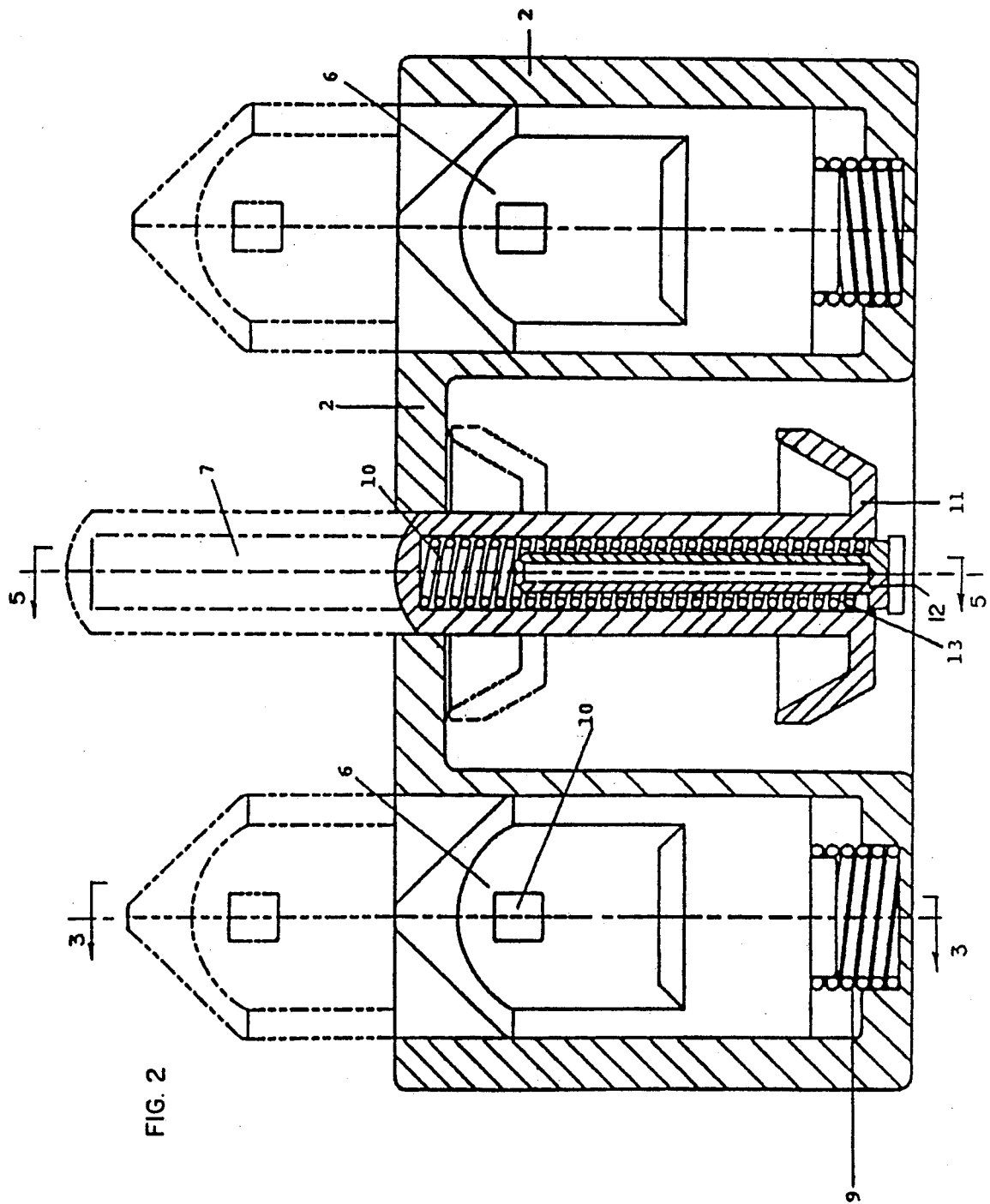
FIG. 2 is a section view of the retractable locking device (2) with the retractable locking housing (6) mounted on a spring (9) and provided with a retractable hook (10). The trigger pin (7) is provided with a cylindrical hook formed flange (11) directed outwards. The trigger pin (7) is guided by a guiding pin (12); around the guiding pin (12) and inside the trigger pin (7) a spring (13) is located which forces the trigger pin (7) to a top position.
Figure 3B:
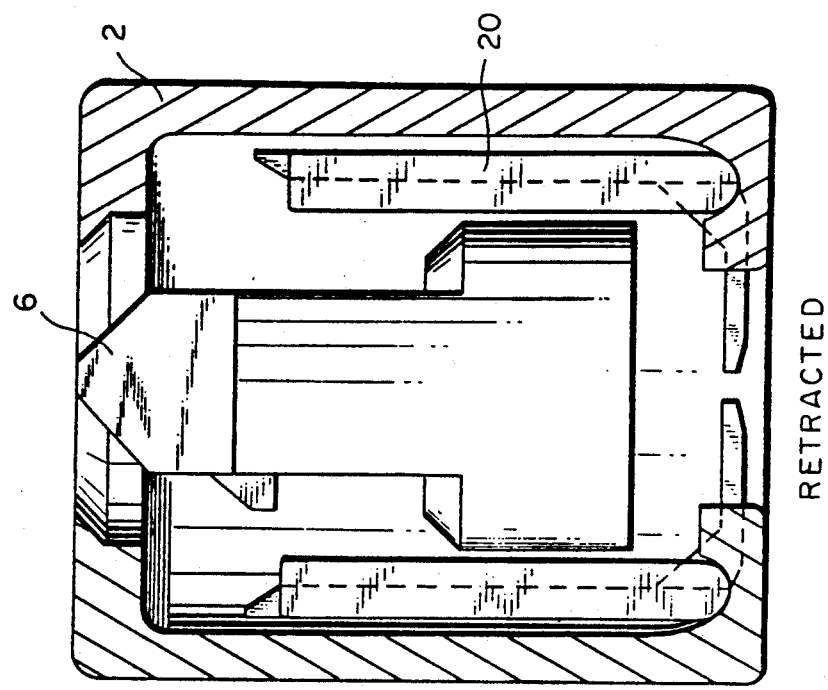
FIG. 3 is a section view of the locking device in locked and retracted position with the locking housing (6) mounted in the box (2). The locking housing (6) is in its locked position locked by two locking plates (20) extending alongside the box (2) underneath the locking housing (6) and the flange of the trigger pin.
Figure 3A:
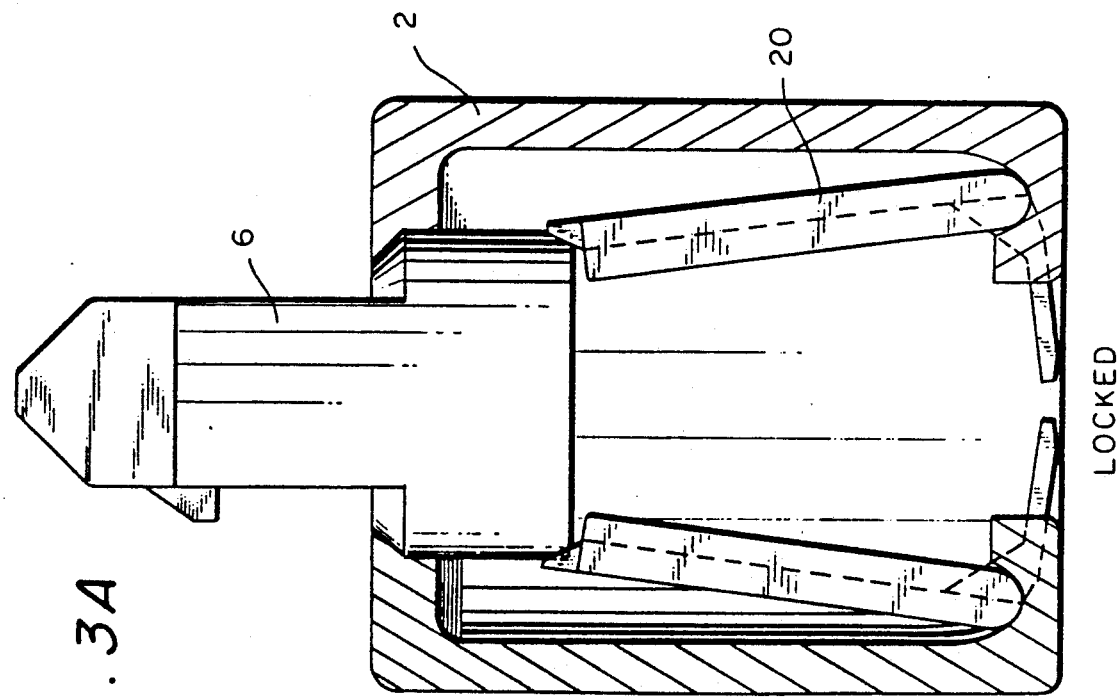
Figure 4A:
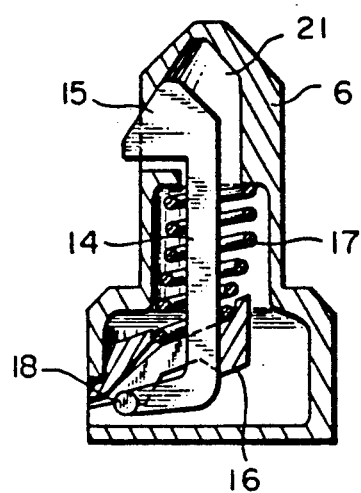
FIG. 4 is a section view of the locking housing (6) comprising a locking upper part mounted on a guiding lower part and provided with a lifting hook (14), with a hook head (15) mounted within the housing into a spring seat (16) at the bottom of the housing. A spring (17) keeps the spring seat (16) and the lift hook (14) in such a position that the hook head (15) is kept in a locking position (B). If the hook head (15) is exposed to pressing or lifting forces, e.g. when a container is loaded, it is forced onto the housing (A). The lifting hook end is L-shaped and provided with a bevelled cylinder (18) positioned at right angle and horizontally to the L-shaped hook end. C is a side view of the locking housing and D is an end view of the locking housing. The locking housing (6) can be non-retractable mounted in the box (1) or retractable mounted in the box (2).
Figure 4B:
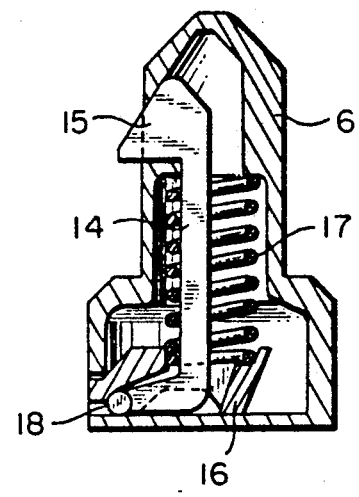
Figure 4C:
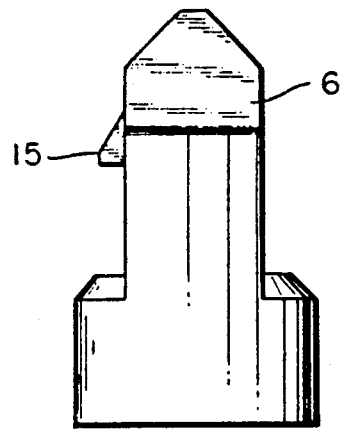
Figure 4D:
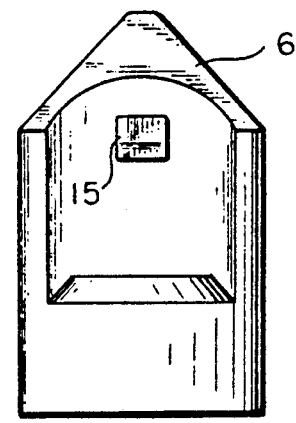
Figure 4E:
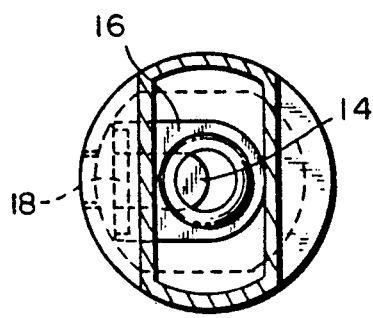
Figure 4F:
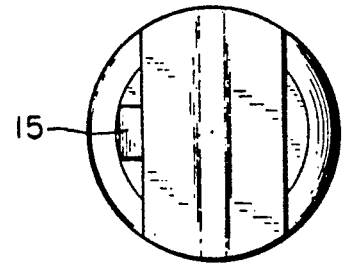

FIG. 1 shows a container vehicle (3) in the form of a railway flat car. It is rated to carry freight containers up to a certain weight and volume. The vehicle in FIG. 1 is designed to carry either one 40 foot or longer container (4) or two shorter containers—each 20 foot (5). The vehicle is provided with a container locking device system that keeps the load of containers locked in position towards the vehicle flat bed at each container corner during transportation, regardless if one or two containers are loaded and without any manual adjustments to the device prior or after loading of the container on the vehicle. At the same time the device provides the necessary 6 inch high gripper space (8) between the car floor and the bottom of the container. This locking device system embodies the principle of the present invention.

The locking device system consists of four fixed non-retractable locks (1) positioned at the outer 40 foot points, two at each end of the car and four retractable locking housings (6) mounted 2 and 2 in a device box (2) positioned at the center of the 40 foot space where the adjacent ends of two 20 foot containers meet. When the container is unloaded, all eight locks stand up in a firm locked position ready to be loaded. When a long container is being loaded it is apparent that the four center locking housings (6) must be retracted below loading height, if the container shall stand on its bottom surface and the container be locked with the locks (1). The retractable locking device system (2) is therefore equipped with one trigger pin (7) which is longer than the locking housings (6), and positioned between the two center locking housings, one at each longside, so that when the long container is being lowered down, it forces the trigger pins downwards so that they in their downward movement removes the locking plates (20) from underneath each side of each center container locking housing (6), leaving the housing in an upraised position only with the help of a steel spring (9) under each housing and henceforth enabling the weight of the container—empty or full—to exceed the spring force and press the locks downwards into the hollow space in the device box (2). When unloading the long container (4) the force from the spring (9) pushes the housings (6) upwards and the trigger pin (7) is moved upwards by the force of a steel spring (13) so that the locking plates (20) are forced back underneath the housings (6), thus preventing them to move downwards unless the trigger pin (7) is first activated. The four fixed non-retractable locks (1) comprising a locking housing (6) fixed mounted on a locking device box are positioned at the 40 foot points and fit into four hollow corner castings on the container by the empty or full weight of the container. The container is kept firmly locked to the vehicle by the locking housings (6) with the spring loaded hook (14) and hook head (15). When the container with its hollow corner castings is lowered over the locks (1,2) the spring loaded hook (14) is pressed into the housing (6) by the edge of the aperture hole in the corner casting and the hook will automatically resume its position as soon as the bottom floor of the corner casting has been lowered below the point of contact with the hook head (15). When the hook has resumed its position inside the corner casting, the size of the locking housing (6) with the hook head is then larger than the bottom hole in the corner casting, and thus locking the container to the vehicle. The container can only be lifted off from the vehicle if a high enough lifting force is applied to the container so that the spring loaded hook (14) will be pressed into the vacant space (21) in the locking housing (6) and thereby decrease the size of the locking housing to the size of the hole in the corner casting of the container. When the container is lifted off from the vehicle, the spring loaded hook (14) will automatically resume its position when the floor of the corner casting is above the point of contact, with the hook (14) and hook head (15), so that the housing (6) is immediately ready to be loaded with a container again, without the need of any manual operations.

Therefore it is obvious that the present container locking system is provided to firmly secure either one 40 foot container by 8 foot or 8 foot 6 inch width or other widths with the same transversal distance between the loading points or two 20 foot containers with the same width differences as above, in the same loading space, without any need of manual operations to adjust or prepare the locks for different container lengths what so ever. The only required force to automatically lock, unlock and retract the container locks, is the force given by the weight of the empty or full container when loaded or unloaded from the vehicle.

I claim:

1. A triggering device arranged in a locking housing comprising a trigger pin with a circular flange directed outwardly and in contact with L-shaped locking plates, a guiding pin arranged on the L-shaped locking plates so that said guiding pin, by the load of a spring arranged within the trigger pin and surrounding the guiding pin, keeps the locking plates in position beneath the flange.

2. A locking housing device comprising one housing consisting of one lower guiding part and one upper locking part mounted on a spring, and kept in locking position by two movable locking plates situated underneath the housing, comprising a triggering device,
   wherein said locking plates are L-shaped and have a bevelled upper edge in a trigger pin area and said housing having a bottom area at the outer parts of the locking area and said locking plate resting on an area in a locking housing of a box.

3. A locking device comprising a box having a top and arranged in said box, two through the box top slidingly mounted locking housings, one at each end of the box, and between said housings a triggering device with a trigger pin, which is longer than the locking housings and provided with a surrounding flange at the bottom of the pin and two at the longside of said box in contact with and beneath the two housings and the trigger pin flange arranged locking plates which by the influence of the flange on the trigger pin is removed from their locking position underneath the locking housings to an upright position.

4. The locking housing according to claim 1, comprising within the housing a L-shaped loaded locking hook with a top head extending out of the locking housing, and said hook having a base mounted in a spring seat so that the spring seat and the hook when the head is effected by outer forces, force the locking hook into a cavity of the housing.

5. The locking housing according to claim 1, wherein said locking housing is mounted fixed in a box.

6. The locking housing according to claim 1, wherein the locking housing is retractably mounted with a triggering device in a box.

7. The locking housing according to claim 3, comprising within the housing a L-shaped loaded locking hook with a top head extending out of the locking housing, and said hook having a base mounted in a spring seat so that the spring seat and the hook when the head is effected by outer forces, force the locking hook into a cavity of the housing.

8. The locking housing according to claim 3, wherein said locking housing is mounted fixed in a box.

9. The locking housing according to claim 3, wherein the locking housing is retractably mounted with a triggering device in a box.

* * * * *